United States Patent [19]

Ashida

[11] Patent Number: 4,780,485

[45] Date of Patent: Oct. 25, 1988

[54] ISOCYANURATE FOAM AND METHOD FOR PRODUCING THE SAME

[75] Inventor: Kaneyoshi Ashida, Farmington Hills, Mich.

[73] Assignee: Harry A. Fischer, Brampton, Canada

[21] Appl. No.: 69,502

[22] Filed: Jul. 2, 1987

Related U.S. Application Data

[63] Continuation-in-part of Ser. No. 944,978, Dec. 22, 1986, abandoned.

[51] Int. Cl.$^4$ .............................................. C08G 18/14
[52] U.S. Cl. .................................... 521/118; 521/164; 521/167; 521/902
[58] Field of Search ............... 521/118, 164, 167, 902; 944/978

[56] References Cited

U.S. PATENT DOCUMENTS 4,101,465 7/1978 Lockwood et al. ................ 521/118

*Primary Examiner*—Maurice J. Welsh
*Attorney, Agent, or Firm*—Arnold S. Weintraub

[57] ABSTRACT

A highly flame retardant and substantially non-combustible polyisocyanurate foam having low friability and no bursting characteristics and method for preparing the same. The method includes the step of reacting an isocyanate having an average isocyanate equivalent weight between about 135 and 145 with a polyether polyol having a hydroxyl number between about 300 and about 600 and a hydroxyl functionality of at least 3. The compounds are combined in amounts to provide NCO/OH equivalent ratio between about 10 and about 50 and are reacted in the presence of a chlorofluorocarbon blowing agent and a catalyst having the general formula:

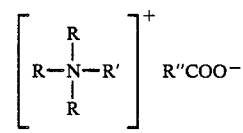

wherein R is a hydrocarbon having between about 1 and about 2 carbon atoms, R' is an alcohol radical having between about 2 and about 3 carbon atoms, and R" is selected from the group consisting of hydrogen and an alkane group having between 1 and 8 carbon atoms.

24 Claims, No Drawings

ISOCYANURATE FOAM AND METHOD FOR PRODUCING THE SAME

CROSS-REFERENCE TO RELATED APPLICATIONS

This application is a continuation-in-part application of copending U.S. patent application Ser. No. 944,978, filed Dec. 22, 1986, and now abandoned for "Isocyanurate Foam and Method for Producing the Same", the disclosure of which is hereby incorporated by reference.

BACKGROUND OF THE INVENTION

1. Field of the Invention

This invention pertains to isocyanurate foam products and methods for making the same. More specifically, this invention relates to a trimerization reaction of a polymeric isocyanate to yield isocyanurate foams having characteristics of outstandingly high flame resistance and low friability. More specifically, this invention relates to a method for producing a polyisocyanurate foam employing a specific trimerization catalyst at an exceptionally high NCO/OH equivalent ratio.

2. Brief Discussion of the Prior Art

The trimerization reaction of isocyanates to yield isocyanurate linkages has been known for over a 100 years. The isocyanurate linkage is an advantageous polymeric linkage because isocyanurate products exhibit high thermal and hydrolytic stability.

In recent years, the preparation of rigid foams containing isocyanurate linkages has been described by a number of investigators. Burkus, in U.S. Pat. No. 2,993,870, reported that isocyanurate-containing foams could be prepared by trimerizing isocyanate-terminated polyester prepolymers. Nicholas and Gmitter, in *Journal of Cellular Plastics*, Volume 1 (1965), described a method for making isocyanurate-containing foams in which isocyanate-terminated polyester prepolymer is dissolved in an excess amount of toluene diisocyanate and subsequently trimerized. Foams obtained by either of these two methods have poor flame resistance.

On the other hand, unmodified isocyanurate foams have been found to be highly temperature-resistant. However, such foams are undesirable because they exhibit high friability. Furthermore, when unmodified isocyanurate foams are exposed to fire, they burst into fragments similar to popcorn. This bursting phenomenon was first solved by modifying the isocyanurate product with urethane or other linkages. For example, in French Pat. No. 1,155,768 to Ashida, an isocyanurate foam with lower bursting and lower friability properties was prepared in which the cross-link density was reduced due to the incorporation of urethane or amide linkages. In preparing the isocyanurate polymer disclosed in the French patent, polymeric isocyanate, a polyether, polyester, a carboxyl-terminated polyester or a polymerized fatty acid were reacted in the presence of a trimerization catalyst at an NCO/OH or NCO/COOH equivalent ratio of greater than 2 and an aliphaticity of less than 0.4. Aliphaticity is defined as a weight ratio of active hydrogen containing compound to polymeric isocyanate.

It has been found that higher NCO/OH (or NCO/COOH) equivalent ratios provide greater flame resistance. However, ordinarily high NCO/OH equivalent ratios lead to higher friability. Because of this, urethane-modified isocyanurate foams are generally produced at an NCO/OH equivalent ratio of from about 3.0 to 5.0. Higher ratios result in highly friable foams which cannot be used in any practical applications.

Since unmodified isocyanurate foams are temperature resistant but exhibit extremely high friability and bursting phenomenon when exposed to flame or high temperatures and foams prepared by trimerizing polymeric isocyanate in the presence of a polyether polyol are less friable but exhibit poor flame resistance, a foam which balances between these properties would be desirable. A good balance between low combustion properties and low foam friability would be achieved by an appropriate percent of isocyanate trimer, usually, in the range of about 18 to about 22 percent. Percent trimer levels above this range yield an unacceptably friable foam; while low-trimer contents are linked with increases in the combustibility of the polymer. Heretofore such foams have not been obtainable.

Thus, it would be desirable to provide an isocyanurate foam having high flame resistance, low combustibility and low foam friability.

SUMMARY OF THE INVENTION

The present invention relates to highly flame resistant, low friability and low combustibility rigid foams and a method of producing the same.

The foams according to the present invention have a content of isocyanurate linkage in an amount of between about 23 and about 30 percent by weight in the resulting foams.

The foams hereof are prepared by the reaction of a specific polymeric isocyanate with a specific polyether polyol at an exceptionally high NCO/OH equivalent ratio, e.g., between 10 and 50, in the presence of a specific trimerization catalyst, a halohydrocarbon blowing agent and a surfactant.

DESCRIPTION OF THE PREFERRED EMBODIMENTS

It has been found that isocyanurate foams having outstandingly high flame resistance, low friability and low smoke generation or combustibility can be prepared by the reaction of:

(a) a polymeric isocyanate having the general formula:

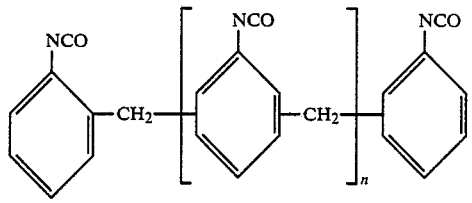

wherein n is an integer between about 0 and about 10, the molecule having an average isocyanate equivalent weight between about 135 and about 145 together; and (b) a polyether polyol having a hydroxyl number between about 300 and about 600 and a hydroxyl functionality of at least 3.

The isocyanate and the polyol are each present in an amount sufficient to provide a specific NCO/OH equivalent ratio of more than 10 and less than 50.

The polyisocyanate and polyol are reacted, in accordance herewith, in the presence of a specific isocyanate trimerization catalyst having the general formula:

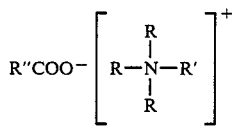

wherein R is a hydrocarbon radical selected from the group consisting of methyl radicals, ethyl radicals and mixtures thereof, R' is an alcohol radical having between about 2 and 3 carbon atoms and R" is either hydrogen or a hydrocarbon radical having between 1 and 8 carbon atoms. Such catalysts are described in detail in U.S. Pat. No. 4,040,991 to Bechara et al which is herein incorporated by reference.

The foam forming reaction hereof is performed in the presence of a halohydrocarbon blowing agent.

A silicone-based surfactant as is conveniently used for rigid urethane foam preparation.

As noted hereinabove, the polymeric isocyanate used in the present invention has the general formula:

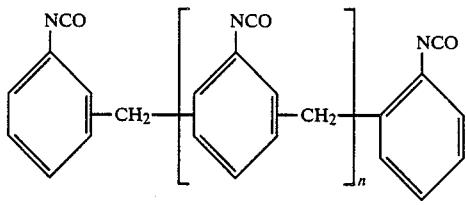

wherein n is an integer between 0 and about 10 and the average isocyanate equivalent weight is in a range from about 135 to about 145. In a preferred embodiment of the present invention, n is an integer of 1 and the isocyanate equivalent weight is in the range of about 139 to about 140. Such isocyanates have an $NCO^-$ content, by weight, of between about 29 and 31 percent, a viscosity of about 700 cps at 25° C. and a molecular weight of about 380. Such isocyanates are commercially available, for example, from Dow Chemical Corporation under the trade name PAPI 580. It is to be understood that other MDIs, such as crude MDI, distilled MDI, etc., can be used herein.

Additionally, it is to be understood that in practicing the present invention minor amounts of other polymeric isocyanates can be used in minor amounts. Thus, minor amounts of crude and distilled toluene diisocyanate, i.e., mixtures of 2,4- and 2,6- toluene diisocyanate can be admixed with the MDI. Where used, the other isocyanate does not exceed about 10 percent, by weight, of the total isocyanate in order not to affect the thermal stability of the foam. However, because of its demonstrated efficacy, the above-defined PAPI 580 is preferred.

The polyether polyol employed in the present invention has a hydroxyl number in the range of about 250 to about 600 mg KOH/g and a hydroxyl functionality of at least three. Ordinarily, a polyol having a functionality of between 3 and 8 may be used in the present invention. Examples of suitable polyether polyols are the alkylene oxides of a polyhydric alcohol. Representative polyhydric alcohols include glycerol, 1,1,1-trimethylpropane, hexane-1,2,6-triol, alpha-methyl glucoside, pentaerythritol, sorbitol and sucrose, and the like, as well as mixtures thereof. Suitable alkylene oxides which may be employed include ethylene oxide, propylene oxide, butylene oxide, amylene oxide, and mixtures thereof. Likewise, the alkylene oxides can be random or block polymers. Such polyether polyols are commercially available from a wide variety of sources.

The polyether polyols which are preferred are polyaddition products of propylene oxide and/or ethylene oxide of a polyfunctional or polyhydric alcohol selected from the group consisting of trimethylopropane, glycerol, pentaerythritol, alpha-methylglucoside, sorbitol, sucrose and mixtures thereof.

It is to be understood herein that the polyol is not critical to foam formation, per se. However, the polyol prevents bursting of the foam which is deleterious in the manufacture of commercially acceptable foam products.

The trimerization catalyst employed in the present invention is a quaternary ammonium carboxylate such as that described in U.S. Pat. No. 4,040,991 to Bechara et al which is hereby incorporated by reference.

In the preferred embodiment hereof, the trimerization catalyst has the general formula:

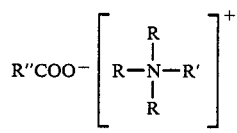

wherein R is a hydrocarbon radical selected from the group consisting of methyl functional groups, ethyl functional groups and mixtures thereof, R' is an alcohol radical having between about 2 and about 3 carbon atoms, and R" is either hydrogen or a hydrocarbon radical having an alkyl group with between 1 and about 8 carbon atoms.

The catalyst is, preferably selected from the group consisting of trimethyl hydroxypropyl ammonium carboxylate, such as trimethyl hydroxypropyl ammonium formate, trimethyl hydroxypropyl ammonium 2 ethylhexanoate, and mixtures thereof. The latter two catalysts are commercially available from Air Products, Inc. under the trade names DABCO TMR and DABCO TMR-2 respectively. These specific two catalysts gave unexpectedly good foams having outstanding flame resistance and low friability at high NCO/OH equivalent ratios, i.e. 10 to 50.

Although the monocarboxylate catalyst is preferred, ammonium dicarboxylate catalysts can be used as well. It has been observed, though, that other conventional trimerization catalysts do not avail themselves with equal efficacy in the practice hereof.

The catalyst is employed in effective weight amounts ranging from about 0.1 to 5.0 parts thereof per 100 parts, by weight of isocyanate, and preferably about 1 to 2 parts.

The blowing agent employed in the present invention is a halohydrocarbon having at least one chlorine and one fluorine atom per molecule. Representative of this type of blowing agent is trichloromonofluoromethane, trichlorotrifluoroethane, dichlorodifluoromethane, dichlorotetrafluoroethane, and mixtures thereof. The blowing agent is employed in an amount ranging from about 5 to 25 percent by weight, based on the weight of the isocyanate. The amount is chosen based on the foam densities required and is not critical in the present invention.

The surfactant to be used in the present invention may be chosen from any of those surfactants commonly used for preparing rigid polyurethane foams, such as polymethyl siloxane-polyoxyalkylene block copolymers and the like. These products are commercially available in the market and known to the skilled artisan. The surfactant is employed in an amount ranging from about 0.1 to 5.0 to percent by weight, based on the weight of the isocyanate. Usually, the amount is in a range of about 1 to 2 percent, by weight.

In the present invention, the polymeric isocyanate and the polyether polyol are employed in amounts which will yield an NCO/OH equivalent ratio in a range between about 10 and about 50. In the present invention, the NCO/OH equivalent ratio is, preferably, more than 10 and less than 30 with the ideal range being between about 15 and 25. At such NCO/OH equivalent ratios, the resulting isocyanurate foam exhibits an optimum combination of low friability and low combustibility.

It has been found, quite unexpectedly, that, unlike conventional trimerization catalysts, the specific trimerization catalysts used herein, function quite effectively within the high NCO/OH equivalent ratio range for the polyisocyanate and the polyol. The isocyanurate foams hereof exhibit unexpectedly high flame resistance and exhibit low friability characteristics. Without being bound to any theory, this is believed to be a result of the higher content of isocyanurate foams hereof, also, exhibit low smoke generation and high thermal insulative values due to the fine cells and high closed cell content.

In order to characterize the present invention, the theoretical weight percent of trimerizable isocyanate groups present in the foams can be determined using the following equation:

$$\% \text{ Trimer} = 4{,}200 \frac{E_i - E_h}{W_i - W_h}$$

wherein $E_i$ is the number of isocyanate equivalents, $E_h$ is the number of hydroxyl equivalents of polyol, $W_i$ is the weight of the isocyanate and $W_h$ is the weight of polyol. Employing this equation in the present invention, foams obtained according to the present method and process have a percent trimer in the range of between about 23 and about 30 percent. In the preferred embodiment, the percent trimer range is between about 25 and about 27 percent.

In preparing isocyanurate foams in accordance herewith, either a one-shot or a prepolymer process can be employed. In the case of a one-shot process, the components are admixed together at ambient temperatures and at atmospheric pressure. However, the blowing agent, polyol and trimerization catalyst and surfactant can be premixed prior to admixture with the polymeric isocyanate. Alternatively, the blowing agent and polymeric isocyanate can be premixed prior to admixture with the other components such as the polyol, surfactant and catalyst which can, likewise, admix in a separate vessel. Both premixed components can then be mixed together to make the foam.

The one-shot process of the present invention has distinct advantages over other processes. Specifically, it has been found that the process has lower costs of production; particularly over two-step or prepolymer processes. Furthermore, the one-shot process has lower viscosities in the reaction mixture which permits faster, more thorough mixing. Finally, the one-shot process permits the user a wide range of mixing ratios of the components which, in turn, permits better mixing.

Where the prepolymer process is employed, more than stoichiometric equivalents of the polymeric isocyanate and the polyol are reacted to form an NCO-terminated prepolymer, having an NCO/OH equivalent ratio of about 10 to 50. The reaction generally proceeds at a temperature ranging from about 20° C. to about 70° C. for a period of time ranging from about one to two hours. The so-formed prepolymer is then trimerized in the presence of the trimer catalyst, blowing agent and surfactant to form the isocyanurate foam hereof.

The amount of trimer catalyst is chosen to obtain a rise time between about 30 seconds and about 120 seconds regardless of the foaming method employed. The amount of blowing agent employed in the present invention can be readily determined by one reasonably skilled in the art depending upon the foam density of the isocyanurate polymer desired.

Following are specific, non-limiting examples of the present invention. In the examples, which are illustrative of the principals set forth herein, all parts are by weight, absent indications to the contrary.

REFERENCE EXAMPLE I

For comparison with foams made according to the process of the present invention, an unmodified rigid isocyanurate foam was prepared using the one-shot method of the present invention.

In a suitable reaction vessel 200 parts of a polymeric MDI commercially available from Dow Chemical under the brand name PAPI 580 having an equivalent weight of 390 were admixed with three parts of DC-193 silicone surfactant commercially available from Dow Corning Corporation. To this admixture was added 36 parts of a trichloromonofluoromethane commercially available from Allied Corporation under the brand name Genetron-11 SBA and 2.0 parts of a trimerization catalyst commercially available from Air Products Corporation under the brand name DABCO TMR having the general formula:

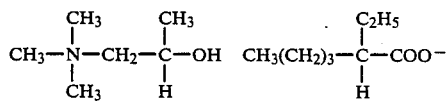

The reaction proceeded at room temperature with high speed stirring with a rise time of about 50 seconds. The resulting foam had a fine closed cellular structure and a low K value. Tumbling friability of the prepared foam was determined by ASTM C421-77. The Bulter Chimney Flammability test method is set forth in ASTM D-3014-76 was also employed; both methods are herein incorporated by reference.

The foam was also tested for burn-through or flame penetration in the method outlined in Bureau of Mines Report of Investigation No. 6366 (1964) by Mitchell et al which is herein incorporated by reference. The results of these tests are set forth in Table I.

As can be seen from the results summarized in Table I, the unmodified isocyanurate foam having no polyol incorporated therein exhibits poor friability properties. For example, percent weight loss by the ASTM tumbling test was 100 percent.

REFERENCE EXAMPLE II

In order to determine the effect of equivalent ratio of polymeric isocyanates in isocyanurate foams, an isocyanurate foam was prepared using a conventional prepolymer process and a high NCO/OH ratio.

In a suitable reaction vessel, a prepolymer was formed by reacting 131 parts of Mondur MR, a polymeric isocyanate commercially available from Mobay Chemical, Inc. having an equivalent weight of 131, and 15.6 parts of Voranol 360, a sucrose-based polyether polyol available from Dow Chemical Corporation. The resulting prepolymer had an NCO/OH equivalent ratio of 10 to 1.

In a separate vessel an admixture was prepared which contained 1.0 parts of DABCO TMR trimerization catalyst, 1.5 parts of DC-193 silicone surfactant, commercially available from Dow Corning Corporation and 16 parts of the Genetron-11 SBA blowing agent. This admixture was mixed with 100 parts of the prepolymer composition at room temperature and high speed. A polyisocyanurate foam began to form. Within 55 seconds after admixture, foam rise was essentially completed. The resulting foam had a fine-closed cellular structure.

The foam was tested according to the test procedures set forth in Example I. The data is set forth in Table II.

EXAMPLE I

An isocyanurate foam was prepared using the prepolymer process of the present invention. First, a prepolymer was prepared by the reactions of 139 parts of PAPI 580, a polymeric isocyanate having an equivalent weight of 139 with 15.6 parts of VORANOL 360. One hundred parts of the prepolymer and 18 parts of the Genetron-1 SBA blowing agent, was admixed with the prepolymer to decrease its viscosity. The NCO/OH equivalent ratio present in the prepolymer was 10:1. The NCO/OH equivalent ratios of the resulting foams were varied from 10 to 29 by adding various amounts of polymeric isocyanate to the prepolymer. The formulation employed is shown in Table III.

The foam, labeled formulation Composition A, prepared by using NCO/OH equivalent ratio of 10 resulted in relatively low percent weight retention of Bulter Chimney Test data.

A second isocyanurate foam was produced according to the prepolymer process set forth in the present invention. However, the amount of PAPI 580/VORANOL 360 prepolymer employed was decreased to 68.8 parts and 31.2 parts of PAPI 580 was added to give an NCO/OH equivalent ratio of 15. The prepolymer was admixed with a mixture of the trimerization catalyst and surfactant described above. The reaction progressed in the manner as shown in Table III, Composition B. Within 50 seconds foam formation was essentially completed. This isocyanurate foam, labeled as Composition B, had better percent weight retention in terms of Bulter Chimney Test.

A third isocyanurate foam was prepared using the prepolymer process of the present invention. In this formulation, 52.7 parts of the prepolymer described previously was admixed with 47.3 parts of PAPI 580. This mixture was thoroughly stirred and combined with 18 parts of the blowing agent, R-11. To this prepolymer mixture was added a mixture of 1.5 parts of the surfactant DC-193 and 0.5 parts of the surfactant DC-193 and 0.5 parts of DABCO TMR, the trimerization catalyst.

This formulation, designated as Composition C, achieved complete foam formation after approximately 120 seconds and had an NCO/OH equivalent ratio of 20.

The physical properties of Compositions A, B and C were tested in the manner set forth in Example I. These results were summarized in Table III. This data can be compared to that of Tables IV and V for foams which were prepared by the one-shot method of the present invention and outlined in Exhibit IV. As can be seen from the data shown in Tables III, IV and V, increased NCO/OH equivalent ratios resulted in increased flame retardence in terms of the Bulter Chimney Test, e.g. 93 to 94 percent without any sacrifice of foam friability.

EXAMPLE II

The effect of NCO/OH equivalent ratios on physical properties of high NCO index foams was determined by the preparation of three isocyanurate foams using the one-shot process of the present invention. The compositions are set forth in Table IV and the NCO/OH equivalent ratios are found therein.

The respective foams were labeled Compositions D through J and were tested according to the test procedures set forth in Example I with the results of these tests set forth in Table IV.

As can be seen from the data collected in Table IV, the flame retardence increased with the increase in NCO/OH equivalent ratios. As can be seen from the friability data collected in that table, polymers prepared using the trimerization catalyst of the present invention exhibited friability characteristics well within accepted limits.

EXAMPLE III

Higher NCO/OH equivalent ratios and their effect on fire endurance were investigated. Foams were prepared using the formulations set forth in Table V having NCO/OH equivalent ratios varying from between about 15 and about 30. The foams were prepared by the one-shot process of the present invention. The prepared foams were tested using the procedures set forth in Example I. The results are also summarized in Table V. As can be seen from the results set forth in Table V, foams having NCO/OH equivalent ratios of 25 and 30 show excellent fire endurance with acceptable friability levels.

EXAMPLE IV

Various trimerization catalysts were studied to determine their effect on polymer formation, friability and fire endurance. These commercially available trimerization catalysts included DABCO K-15, DABCO-DBU, POLYCAT SA-1, POLYCAT-41, DABCO TMR and DABCO TMR2, all commercially available from Air Products Corporation.

Isocyanurate foams were prepared using these various trimerization catalyst. These were labeled Compositions O through R. Isocyanurate compositions prepared using the catalysts DABCO DBU and POLYCAT SA-1 exhibited no foaming. Isocyanurate polymers employing POLYCAT 41 as the trimerization catalyst exhibited an extremely high density foam, inappropriate for physical testing. The isocyanurate foam prepared using POLYCAT K-15 as the catalyst yielded a complete reaction after 80 seconds and provided a foam with good appearance in cell size. The density, friability and fire endurance were tested using the method set forth in Example I and compared with isocyanurate foams prepared in the same manner using the catalysts DABCO TMR and DABCO TMR-2. As can be seen from the data collected in Table VI, the catalysts DABCO K-15 yielded a good foam having fine cells but provided poor friability and fire endurance characteristics.

TABLE I
COMPOSITION AND PHYSICAL CHARACTERISTICS OF A CONVENTIONAL UNMODIFIED ISOCYANURATE FOAM PREPARED ACCORDING TO A ONE-SHOT PROCESS

| Component | Amount |
|---|---|
| Isocyanate[1] | 200 |
| blowing agent[2] | 36 |
| trimerization catalyst[3] | 2.0 |
| surfactant[4] | 3.0 |
| Foam Properties | |
| Density (kg/m$^3$) | 34.2 |
| Bulter Chimney Test (% wt. retained) | 97.0 |
| Burnthrough Time | bursting back side |
| Friability (% wt. loss) | 100 |

[1]PAPI 580 commercially available from Dow Chemical Corp.
[2]Genetron-11 SBA, trichloromonofluoromethane, commercially available from Allied Corporation.
[3]DABCO TMR, trimethyl hydroxypropyl ammonium 2-ethylhexanoate, commercially available from Air Products Corp.
[4]DOW CORNING DC-193, a silicone surfactant, commercially available from Dow Corning Corp.

TABLE II
COMPOSITION AND PHYSICAL CHARACTERISTICS OF A CONVENTIONAL ISOCYANURATE FOAM PREPARED ACCORDING TO A PREPOLYMER PROCESS

| Component | Amount (y) |
|---|---|
| Prepolymer[1] | 100 |
| Surfactant[2] | 1.5 |
| Trimerization Catalyst[3] | 1.0 |
| Blowing Agent[4] | 16 |
| Physical Characteristics | |
| NCO/OH Equivalent Ratio | 10 |
| Appearance | Fine |
| Cell Size | Fine |
| Cream Time (sec) | 5 |
| Rise Time (sec) | 55 |
| Tack Free Time (sec) | 140 |
| Foam Properties | |
| Foam Density (kg/m$^3$) | 36.3 |
| Friability (% wt. loss) | 20.3 |
| Burnthrough Time (min) | 36 |
| Bulter Chimney Test (% wt. retained) | 90.2 |

[1]an reaction product of 131 grams of Mondur MR polymeric isocyanate commercially available from Mobay Chemical Corp. and 15.6 grams of Voranol 360, a sucrose-based polyether polyol commercially available from Dow Chemical Corp.
[2]DOW CORNING-193, a silicone surfactant commercially available from Dow Corning Corporation.
[3]DABCO TMR, trimethyl hydroxypropyl ammonium 2-ethylhexanoate, commercially available from Air Products Corporation.
[4]GENETRON-11 SBA, trichloromonofluoroethane commercially available from Allied Corporation.

TABLE III
COMPOSITION AND PHYSICAL CHARACTERISTICS OF ISOCYANURATE FOAMS PREPARED ACCORDING TO THE PREPOLYMER PROCESS OF THE PRESENT INVENTION COMPARISON OF NCO/OH EQUIVALENT RATIOS

| | Comp. A (g) | Comp. B (g) | Comp. C (g) |
|---|---|---|---|
| Component | | | |
| Prepolymer[1] | 100 | 68.8 | 52.7 |
| Polymeric isocyanate[2] | 0 | 31.2 | 47.3 |
| DC-193 | 1.5 | 1.5 | 1.5 |
| DABCO-TMR | 1.0 | 0.5 | 0.5 |
| Genetron-11 SBA | 18 | 18 | 18 |
| Physical Characteristics | | | |
| NCO/OH Equivalent Ratio | 10 | 15 | 20 |
| Appearance | very fine | fine | fine |
| Cell Size (sec) | very fine | fine | fine |
| Cream Time (sec) | 5 | 10 | 30 |
| Rise Time (sec) | 30 | 50 | 120 |
| Foam Properties | | | |
| Density (kg/m$^3$) | 34.9 | 35.1 | 33.8 |
| Friability (% wt. loss) | 8.5 | 19.5 | 47.5 |
| Bulter Chimney Test (% wt. retained) | 90.6 | 94.0 | 93.5 |

[1]an reaction product of 131 grams of Mondur MR, a polymeric isocyanate commercially available from Mobay Chemical Corp., and 15.6 grams of Voranol, a sucrose-based polyether polyol, commercially available from Dow Chemical Corp.
[2]PAPI 580, commercially available from Dow Chemical Corp.

TABLE IV
EFFECT OF NCO/OH RATIOS ON FOAM PROPERTIES

| | Comp. D (g) | Comp. E (g) | Comp. F (g) | Comp. G (g) | Comp. H (g) | Comp. I (g) | Comp. J (g) |
|---|---|---|---|---|---|---|---|
| Component | | | | | | | |
| PAPI 580 | 100 | 100 | 100 | 100 | 200 | 200 | 200 |
| Voranol 360 | 7.5 | 11.3 | 22.6 | 5.6 | 15 | 11.2 | 9.0 |
| Genetron-11 SBA | 18 | 18 | 18 | 18 | 36 | 36 | 36 |
| DABCO TMR | 1.0 | 1.0 | 1.0 | 1.0 | 2.0 | 2.0 | 2.0 |
| DC-193 | 1.5 | 1.5 | 1.5 | 1.5 | 3.0 | 3.0 | 3.0 |
| Physical Characteristics | | | | | | | |
| NCO/OH Equivalent Ratios | 15 | 10 | 5 | 20 | 15 | 20 | 25 |
| Appearance | fine | fine | fine | fine | fine | fine | fine |
| Cell Size | fine | fine | fine | fine | fine | fine | fine |
| Cream Time (sec) | 25 | 25 | 15 | 25 | 35 | 35 | 30 |
| Rise Time (sec) | 70 | 70 | 40 | 70 | 90 | 120 | 70 |
| Foam Properties | | | | | | | |
| Density (kg/m$^2$) | 35.4 | 35.4 | 38.4 | 34.4 | 35.1 | 35.7 | 33.8 |
| Friability (% wt. loss) | 28.2 | 33.3 | 23.4 | 32.4 | 32.4 | 40.0 | 31.4 |
| Bulter Chimney Test (% wt. | 97.3 | 94.4 | 82.1 | 97.1 | 97.1 | 97.1 | 97.0 |

TABLE IV-continued
EFFECT OF NCO/OH RATIOS ON FOAM PROPERTIES

|  | Comp. D (g) | Comp. E (g) | Comp. F (g) | Comp. G (g) | Comp. H (g) | Comp. I (g) | Comp. J (g) |
|---|---|---|---|---|---|---|---|
| retained) | | | | | | | |
| Burnthrough Time | >one hour | >one hour | >one hour | >one hour | >one hour | >one hour | >one hour |

TABLE V
EFFECT OF ELEVATED NCO/OH RATIOS ON FOAM PROPERTIES

|  | Comp. K (g) | Comp. L (g) | Comp. M (g) | Comp. N (g) |
|---|---|---|---|---|
| Component | | | | |
| PAPI 580 | 100 | 100 | 100 | 100 |
| Polyol[1] | 6.6 | 4.0 | 5.0 | 3.3 |
| Genetron-11 SBA | 18 | 18 | 18 | 18 |
| Dabco TMR | 1.0 | 1100 | 1.0 | 1.0 |
| DC-193 | 1.5 | 1.5 | 1.5 | 1.5 |
| Physical Characteristics | | | | |
| NCO/OH Equivalent Ratio | 15 | 25 | 20 | 30 |
| Appearance | fine | fine | fine | fine |
| Cell Size | fine | fine | fine | fine |
| Cream Time (sec.) | 25 | 25 | 25 | 20 |
| Rise Time (sec.) | 65 | 55 | 56 | 55 |
| Foam Properties | | | | |
| Density (kg/m³) | 36.4 | 35.4 | 35.2 | 34.4 |
| Friability (% wt. loss) | 24.6 | 30.3 | 31.3 | 37.4 |
| Bulter Chimney Test (% wt. retained) | 97.3 | 97.2 | 97.0 | 97.1 |
| Burnthrough Time | >one hr. | >one hr. | >one hr. | >one hr. |

[1]Pluracol TP 440 commercially available from BASF Corp. trimethylolpropane-based polyether polyol having a hydroxy number of 408 mgKOH/g and a hydroxy equivalent of 138.

TABLE VI
EFFECT OF VARIOUS CATALYSTS ON POLYMERS PREPARED ACCORDING TO THE ONE-SHOT PROCESS OF THE PRESENT INVENTION

|  | Comp. O (g) | Comp. P (g) | Comp. Q (g) | Comp. R (g) |
|---|---|---|---|---|
| Component | | | | |
| PAPI 580 | 100 | 100 | 100 | 100 |
| Voranol 360 | 7.5 | 7.5 | 7.5 | 7.5 |
| Genetron-11 SBA | 18 | 18 | 18 | 18 |
| DC-193 | 1.5 | 1.5 | 1.5 | 1.5 |
| Catalyst (kind) | DBU[1] | K-15[2] | SA-1[3] | Polycat 41[4] |
| (amount) | 1.0 | 1.0 | 1.0 | 1.0 |
| Physical Characteristics | | | | |
| NCO/OH Equivalent Ratio | 15 | 15 | 15 | 15 |
| Appearance | NA | good | NA | NA |
| Cell Size | NA | good | NA | NA |
| Cream Time (sec.) | 70 | 25 | 60 | 50 |
| Rise Time (sec.) | no foam | 80 | no foam | 8 min. |
| Foam Properties | | | | |
| Density (kg/m³) | NA | 40.4 | NA | high density |
| Friability (% wt. loss) | NA | 43.6 | NA | NA |
| Bulter Chimney Test (% wt. retained) | NA | 35.1 | NA | NA |

[1]Polycat DBU, a trimerization catalyst commercially available from Air Products Corporation.
[2]Dabco K-15, a trimerization catalyst commercially available from Air Products Corporation.
[3]Polycat SA-1, a trimerization catalyst commercially available from Air Products Corporation.
[4]Polycat 41, a trimerization catalyst commercially available from Air Products Corporation.

Having thus described the invention, what is claimed is:

1. A method for preparing a modified polyisocyanurate foam comprising:
reacting (a) an isocyanate having the general formula:

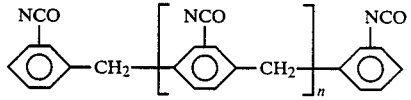

wherein n is an integer between 0 and about 10 and an average isocyanate equivalent weight between about 135 and about 145, with (b) a polyether polyol having a hydroxyl number between about 300 and about 600 and a hydroxyl functionality of at least 3 in the presence of a catalyst consisting essentially of a hydroxyalkylammonium carboxylate having the general formula:

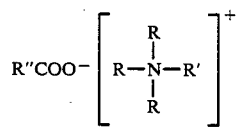

wherein R is a hydrocarbon selected from the group consisting of methyl radicals, ethyl radicals and mixtures thereof, R' is an alcohol radical having between 2 and 3 carbon atoms, and R" is either hydrogen or an alkyl group having between 1 and 8 carbon atoms wherein the isocyanate and the polyether polyol are present in an NCO/OH ratio between about 10:1 and about 50:1.

2. The method of claim 2 wherein the NCO/OH ratio is between about 10:1 and about 30:1.

3. The method of claim 2 wherein the NCO/OH ratio is between about 15:1 and about 25:1.

4. The method of claim 1 wherein the isocyanate has the general formula:

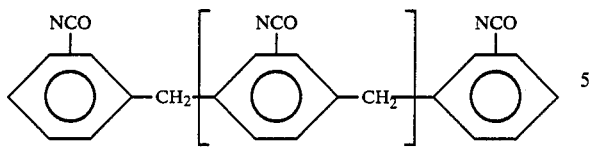

and the molecule has an average isocyanate equivalent weight between about 137 and about 141.

5. The method of claim 1 wherein the trimerization catalyst is a trimethyl hydroxypropyl ammonium carboxylate.

6. The method of claim 5 wherein the trimethyl hydroxypropyl ammonium carboxylate is selected from the group consisting of trimethyl hydroxypropyl ammonium formate, trimethyl hydroxypropyl ammonium 2-ethylhexanoate and mixtures thereof.

7. The method of claim 1 wherein the reaction occurs in the presence of a halohydrocarbon blowing agent.

8. The method of claim 7 wherein the blowing agent is a chlorofluorocarbon selected from the group consisting of trichloromonofluoroethane, trichlorotrifluoroethane, dichlorodifluoroethane, dichlorotetrafluoroethane and mixtures thereof.

9. The method of claim 1 wherein the polyether polyol is an adduct of (a) an alkylene oxide selected from the group consisting of propylene oxide, ethylene oxide and mixtures thereof and (b) a polyfunctional alcohol selected from the group consisting of trimethylolpropane, glycerol, pentaerythritol, alpha-methyl glucoside, sorbitol, sucrose and mixtures thereof.

10. The method of claim 9 wherein the polyfunctional alcohol is sucrose.

11. The method of claim 9 wherein the polyfunctional alcohol is trimethylol propane.

12. Substantially non-combustible isocyanurate foam prepared according to the method of claim 1 wherein the foam contains trimerized isocyanate in an amount between about 23 and about 30 percent by weight based on the total weight of the foam based on the equation:

$$\% \text{ Trimer} = 4,200 \frac{Ei - Eh}{Wi - Wh}$$

wherein Ei is the number of isocyanate equivalents, Eh is the number of hydroxyl equivalents; W is the isocyanate weight and Wh is the polyether polyol weight.

13. The isocyanate foam of claim 12 wherein the percent of trimerized isocyanate is between about 24 percent and about 28 percent.

14. The isocyanate foam of claim 12 wherein the percent of trimerized isocyanate is between about 25 percent and about 27 percent.

15. A method for preparing a modified polyisocyanurate foam comprising the steps of:

A. preparing a prepolymer from an admixture of an isocyanate having the general formula:

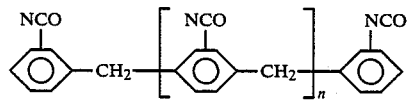

wherein n is an integer between 0 and about 10, the isocyanate having an average isocyanate equivalent weight between about 135 an about 145; and a polyether polyol having a hydroxyl number between about 300 and about 600 and a hydroxyl functionality of at least 3, wherein the polyether polyol and isocyanate are present in amounts yielding an NCO/OH equivalent ratio between about 10 and about 50, B. adding a trimerization catalyst to the prepolymer formed in Step A, the catalyst consisting essentially of a hydroxyalkylammonium carboxylate having the general formula:

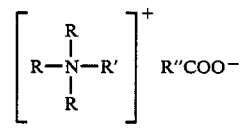

wherein R is a hydrocarbon radical selected from the group consisting of methyl functional groups, ethyl functional groups and mixtures thereof, R' is an alcohol radical having between about 2 and about 3 carbon atoms and R" is selected from the group consisting of hydrogen, and a hydrocarbon having between about 1 and about 8 carbon atoms; and C. admixing a blowing agent to either the prepolymer or the catalyst;

the blowing agent being a halohydrocarbon having between about 1 and 2 carbon atoms and at least one chlorine and one fluorine atom.

16. The method of claim 15 wherein the trimerization catalyst is a trimethyl hydroxypropyl ammonium carboxylate.

17. The method of claim 16 wherein the trimethyl hydroxypropyl ammonium carboxylate is selected from the group consisting of trimethyl hydroxypropyl ammonium formate, trimethyl hydroxypropyl ammonium 2-ethylhexanoate and mixtures thereof.

18. The method of claim 15 wherein the NCO/OH ratio is between about 15:1 and about 25:1.

19. The method of claim 15 wherien the isocyanate had the general formula:

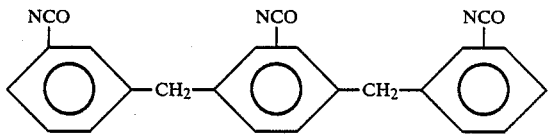

and has an average isocyanate equivalent weight of 139.

20. The method of claim 15 wherein the blowing agent is a halohydrocarbon selected from the group consisting of trichloromonofluoromethane, trichlorotrifluoroethane, dichlorodifluoroethane, dichlorotetrafluoroethane and mixtures thereof.

21. The method of claim 15 wherein the polyether polyol is an adduct of an alkylene oxide selected from the group consisting of propylene oxide, ethylene oxide and mixtures thereof and a polyfunctional alcohol selected from the group consisting of trimethylolpropane, glycerol, pentaerythritol, alpha-methyl glucoside, sorbitol, sucrose and mixtures thereof.

22. Substantially non-combustible isocyanurate foam prepared according to the method of claim 15 wherein the foam contains trimerized isocyanate in an amount between about 23 and about 30 percent by weight based on the total weight of the foam as calculated by the following equation:

$$\% \text{ Trimer} = 4,200 \frac{Ei - Eh}{Wi - Wh}$$

wherein Ei is the number of isocyanate equivalents, Eh is the number of hydroxyl equivalents, Wi is the isocyanate weight and Wh is the polyetherpolyol weight.

23. The isocyanurate foam of claim 22, wherein the trimerized isocyanate is present in an amount between about 24 and about 28 percent by weight.

24. The isocyanurate foam of claim 22, wherein the trimerized isocyanate is present in an amount between about 25 and about 27.

* * * * *